United States Patent
Mitchell et al.

(10) Patent No.: US 7,363,670 B2
(45) Date of Patent: Apr. 29, 2008

(54) FORMED FRONT HEADER FOR A DOCK LEVELER

(75) Inventors: Michael Mitchell, Milwaukee, WI (US); Timothy Muhl, Slinger, WI (US); Matthew Tourdot, West Bend, WI (US); Jack Morehart, Janesville, WI (US); Michael A. Swessel, Menomonee Falls, WI (US); Grant Leum, Muskego, WI (US); Brian Bender, Brookfield, WI (US); Henri V. Muers, 's Hertogenbosch (NL)

(73) Assignee: Rite-Hite Holding Corporation, Milwaukee, WI (US)

( * ) Notice: Subject to any disclaimer, the term of this patent is extended or adjusted under 35 U.S.C. 154(b) by 25 days.

(21) Appl. No.: 10/902,458

(22) Filed: Jul. 29, 2004

(65) Prior Publication Data
US 2006/0021164 A1 Feb. 2, 2006

(51) Int. Cl.
*E01D 1/00* (2006.01)
(52) U.S. Cl. ......................................... 14/71.1; 16/234
(58) Field of Classification Search ................. 14/69.5, 14/71.1, 71.3; 16/234
See application file for complete search history.

(56) References Cited

U.S. PATENT DOCUMENTS

| | | |
|---|---|---|
| 3,587,126 A | 6/1971 | Potter |
| 3,786,530 A | 1/1974 | Le Clear ...................... 14/71.3 |
| 4,455,703 A | 6/1984 | Fromme et al. |
| 4,718,136 A | 1/1988 | Fisher et al. |
| 5,651,155 A * | 7/1997 | Hodges et al. ................ 14/71.3 |
| 5,781,953 A | 7/1998 | Winter |
| 5,815,871 A | 10/1998 | Borchardt |
| 5,832,554 A * | 11/1998 | Alexander ................... 14/71.1 |
| 5,926,890 A | 7/1999 | Alexander |

(Continued)

FOREIGN PATENT DOCUMENTS

DE 2634652 2/1978

(Continued)

OTHER PUBLICATIONS

International Search Authority, *International Search Report*, Oct. 25, 2005, 3 Pages.

(Continued)

*Primary Examiner*—Gary S. Hartmann
(74) *Attorney, Agent, or Firm*—Hanley, Flight & Zimmerman, LLC

(57) ABSTRACT

A dock leveler includes a pivotally extendable lip coupled to a pivotal deck by way of a front hinge, wherein the structure in the area of the front hinge optimizes the torsional flexibility of the deck; provides a well supported, durable crown (apex angle between an extended lip and the deck); and reduces the part count of the dock leveler. The front hinge includes a deck-hinge member that extends approximately the full width of the deck and is preferably formed from a single sheet of material. A particularly narrow front header or flange disposed along the front edge of the deck reinforces the relatively thin deck plate so that the plate's rigidity more closely matches that of the thicker lip, yet the flange is sufficiently small to allow the deck to twist so that the deck can place the tip of the lip squarely upon a sideways inclined truck bed.

7 Claims, 5 Drawing Sheets

U.S. PATENT DOCUMENTS

| | | | | |
|---|---|---|---|---|
| 6,035,475 | A * | 3/2000 | Alexander | 14/71.1 |
| 6,081,955 | A | 7/2000 | Dumlao et al. | |
| 6,327,733 | B1 * | 12/2001 | Alexander et al. | 14/71.7 |
| 6,370,719 | B1 | 4/2002 | Alexander | |
| 6,442,783 | B1 | 9/2002 | Yoon et al. | 14/71.1 |
| 6,473,926 | B2 * | 11/2002 | Lounsbury | 14/71.1 |
| 6,931,686 | B2 * | 8/2005 | Hoofard et al. | 14/69.5 |
| 2002/0092102 | A1 * | 7/2002 | Lounsbury | 14/71.3 |
| 2005/0132512 | A1 * | 6/2005 | Muhl et al. | 14/71.1 |

FOREIGN PATENT DOCUMENTS

| | | |
|---|---|---|
| DE | 2852888 | 8/1980 |
| WO | WO2004039710 | 5/2004 |

OTHER PUBLICATIONS

International Search Authority, *Written Opinion*, Oct. 25, 2005, 5 Pages.

International Bureau, "International Preliminary Report on Patentability" issued on Jan. 30, 2007, (7 pages).

* cited by examiner

FORMED FRONT HEADER FOR A DOCK LEVELER

BACKGROUND OF THE INVENTION

1. Field of the Invention

The subject invention generally pertains to dock levelers and more specifically to the structure around a hinge that pivotally connects a lip extension plate to the deck of a dock leveler.

2. Description of Related Art

A typical truck loading dock of a building includes an exterior doorway with an elevated platform for loading and unloading vehicles such as trucks and trailers. Many loading docks have a dock leveler to compensate for a height difference that may exist between the loading dock platform and an adjacent bed of a truck or trailer. A typical dock leveler includes a deck that is hinged along its back edge so that the deck can pivotally adjust the height of its front edge to an elevation that generally matches the height of the rear edge of the truck bed.

In addition, usually a front hinge pivotally connects an extension plate or lip to the front edge of the deck. The front hinge allows the lip to pivot between a stored, pendant position and an extended, operative position. In the extended position, the lip can rest upon the truck bed to form a bridge between the deck and the bed. This allows personnel and material handling equipment, such as a forklift truck, to readily move on and off the vehicle during loading and unloading operations.

The design of the front hinge and the adjoining structure determines some key features of the dock leveler. These features include the crown, openness of the front hinge, flexibility of the deck, and part count.

First, the crown is the angle or apex created between the upper surfaces of the deck and an extended lip. The crown angle is usually about two or three degrees less than 180 degrees, and it becomes an important feature when the truck bed is higher than the platform from which the deck extends. When the truck bed is higher than the platform, the deck must lie at an incline to elevate the deck's front edge. If the lip were coplanar with the deck, whereby no crown existed, the lip would project its distal edge (tip of the lip) a little above the truck bed. This would create a detrimental step between the tip of the lip and the truck bed, wherein the step might trip dockworkers or jar forklifts. A crown eliminates this step by pointing the tip of the lip back down against the truck bed.

It can be difficult, however, to maintain a desired crown as the weight of a forklift repeatedly carrying loads over the front hinge area of the dock leveler generates tremendous forces that tend to flatten the crown over time. Numerous hinge and lip structures have been devised to counter such forces; however, many of them rely on a single abutment subjected to high stress concentrations. A common example of such an abutment would be the back edge of the lip abutting the front edge of the upper deck plate. With such a design, high stress concentrations can eventually wear down the abutment to diminish or eliminate the crown. Other dock levelers, such as disclosed in U.S. Pat. No. 5,815,871, involve assemblies having intricate cross-sectional shapes that can be expensive to produce.

The second mentioned feature of the dock leveler pertains to the openness of the front hinge, which connects the lip to the deck. The openness refers to any gaps that may exist at the hinge when the lip is at its pendant position. U.S. Pat. No. 3,587,126 provides an example of a dock leveler whose front hinge is of an open design, while U.S. Pat. No. 6,370,719 shows a hinge of a more closed design. Although either style may function well, some believe that a closed-style hinge looks cleaner, provides less of a pinching hazard, and prevents items from accidentally falling between the pendant lip and the deck.

Third, torsional flexibility of the deck or the ability of the top surface of the deck to twist out of its normal plane of flatness is another important feature of a dock leveler. Such flexibility allows the deck to twist so that the front edge of the deck and the lip extending from it can align themselves to the plane of the truck bed. For instance, if the dock platform is level but the truck bed lies at an angle from the right to left side of the truck, the deck can twist accordingly.

The deck's torsional flexibility is partially determined by the existence or absence of a front header. When present, the front header usually lies just behind the front hinge and extends generally perpendicular to a series of beams that support the upper plate of the deck. These beams are typically welded or otherwise affixed to the header—which thus serves to structurally tie the beams together. Often, the front hinge is mounted directly to the front header. U.S. Pat. No. 6,370,719 shows an example of a dock leveler with a front header, and U.S. Pat. No. 3,587,126 shows one without a header. Some decks with headers are torsionally too stiff, while other decks without headers can be too flexible. Without a header, the top plate of the deck may be so flexible and unsupported that the weight of forklifts may deform the plate in the areas between its supporting beams, whereby the plate becomes permanently dished down in those areas.

Fourthly, the part count of a front hinge assembly can have a direct affect on the cost of a dock leveler. Generally, the number of parts is preferably kept to a minimum, which can be difficult to do when the hinge assembly comprises a series of spaced-apart hinge segments that are pivotally connected by a hinge pin.

Consequently, a need exists for a front header and hinge assembly that provides a dock leveler with a minimal number of parts, a long lasting crown, a generally closed hinge, and a deck with appropriate flexibility.

SUMMARY OF THE INVENTION

In some embodiments, a dock leveler includes a front hinge that pivotally connects a lip to a deck of the leveler, wherein the front hinge includes a formed deck-hinge member that extends between at least two of the deck's support members.

In some embodiments the formed deck-hinge member extends along most of the deck's width.

In some embodiments, the front hinge of the dock leveler closes most of the gap between the lip and the deck when the lip is at the pendant position.

In some embodiments, the front hinge comprises a deck-hinge member pinned to a plurality of lip-hinge members, wherein the plurality of lip-hinge members extend into a corresponding plurality of apertures in the deck-hinge member.

In some embodiments, the deck-hinge member has a plurality of slits for engaging a plurality of support beams underneath the top plate of the deck.

In some embodiments, the lip in an extended position engages a front edge of the deck and an upper surface of the deck-hinge member to ensure that a crown or apex exists where the lip and deck meet.

In some embodiments, the deck includes a narrow front header or flange that provides the deck with a desired amount of torsional flexibility while supporting the deck plate at it's free edge to help prevent deformation in the areas between the deck's support beams.

In some embodiments, the front header provides the front edge of the deck's top plate with a level of flexibility that is comparable to that of the lip even though the average material thickness of the lip is greater than that of the top plate.

In some embodiments, the bottom edge of the front header is above the longitudinal centerline of the front hinge pin.

In some embodiments, the bottom edge of the front header is above the front hinge pin.

In some embodiments, the bottom edge of the front header is above the deck-hinge member.

In some embodiments, the deck-hinge member engages the hinge pin along a curved surface that extends less than 360-degrees around the hinge pin.

DESCRIPTION OF THE PREFERRED EMBODIMENT

Figure 1:
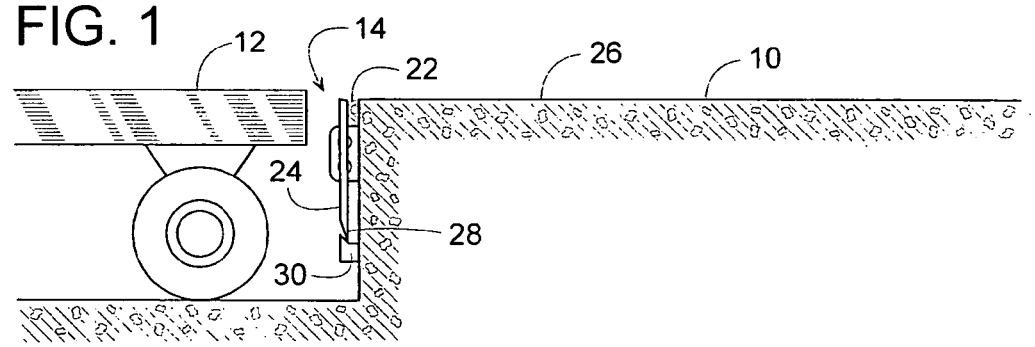
FIG. 1 is a side view of a truck at a loading dock, wherein the dock includes a dock leveler whose deck and lip are at their stored positions.
Figure 2:
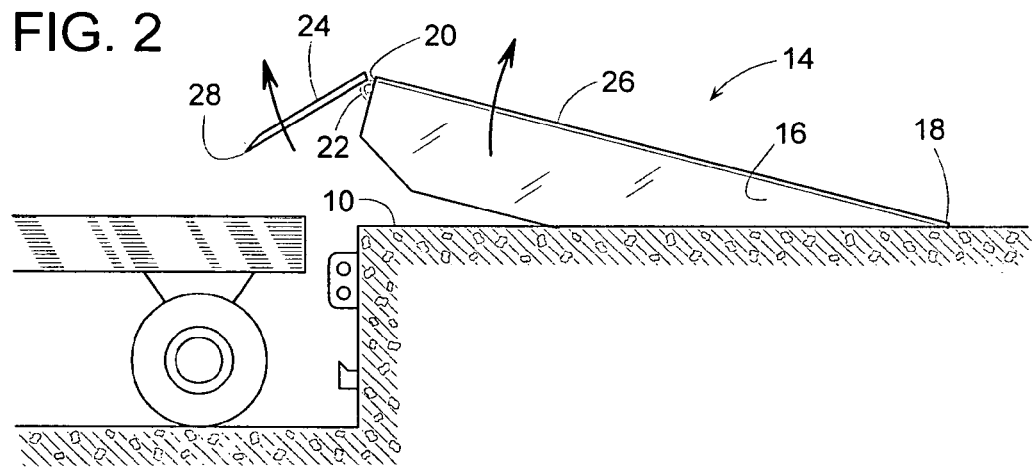
FIG. 2 is side view similar to FIG. 1 but showing the deck rising and the lip extending.
Figure 3:
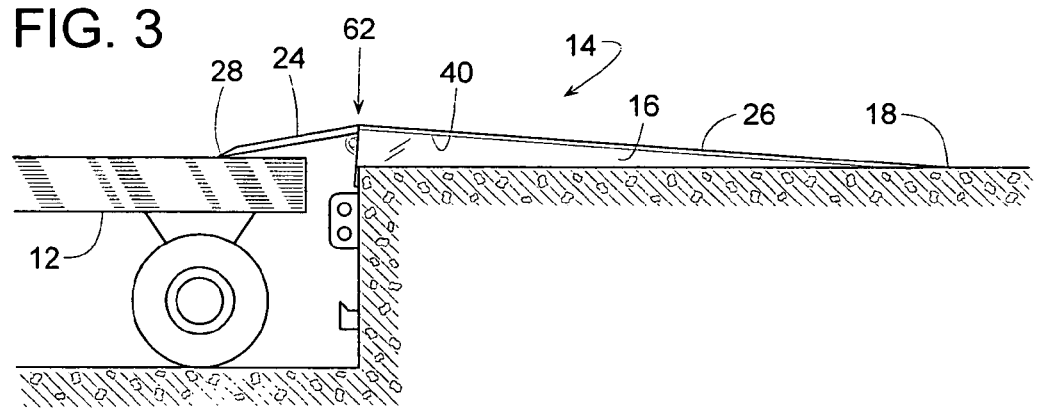
FIG. 3 is a side view similar to FIGS. 1 and 2 but showing the deck having lowered the lip upon the bed of the truck.
Figure 4:
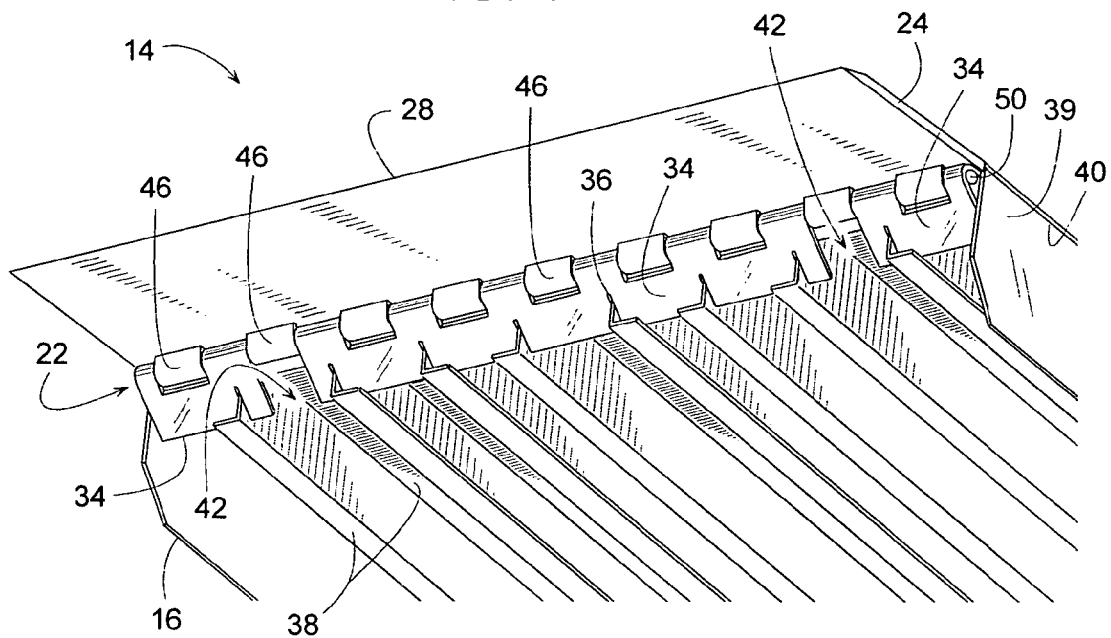
FIG. 4 is a perspective view of the dock leveler of FIG. 3.

Referring to FIGS. 1-3, in order to compensate for a height differential that may exist between a loading dock platform 10 and the bed of a truck 12, a dock leveler 14 includes a ramp or deck 16 that can pivot about its back edge 18 to adjust the height of its front edge 20. To bridge the gap between the deck's front edge 20 and the rear edge of truck 12, a front hinge 22 pivotally connects a lip 24 to the deck's front edge 20. Deck 16 is movable between a raised position (FIG. 2) and a lowered position (FIG. 1), and lip 24 can pivot between an extended position (FIG. 3) and a pendant position (FIG. 1).

In operation, truck 12 backs into the loading dock, adjacent to platform 10, as shown in FIG. 1. At this point, deck 16 is at its stored, cross-traffic position where a driveway surface 26 of deck 16 is generally flush with platform 10. Also, lip 24 is shown at its pendant position where, in some embodiments, a tip 28 of lip 24 rests upon a set of lip keepers 30.

Next, referring to FIG. 2, deck 16 rises and lip 24 swings out to extend the tip 28 of lip 24 out over the top of the truck bed.

Then, in FIG. 3, deck 16 descends to place the extended lip 24 upon the bed of truck 12. The movement of lip 24 and deck 16 can be carried out in any of a wide variety of ways that are well known to those of ordinary skill in the art. The movement, for example, can be powered, manually driven, or a combination of the two. Mechanisms for moving deck 16 or lip 24 include, but are not limited to, hydraulic cylinder or bladder, pneumatic cylinder or bladder, mechanical linkage, drive screw, rack and pinion, winch, mechanical spring, gas spring, and various combinations thereof.

Figure 6:
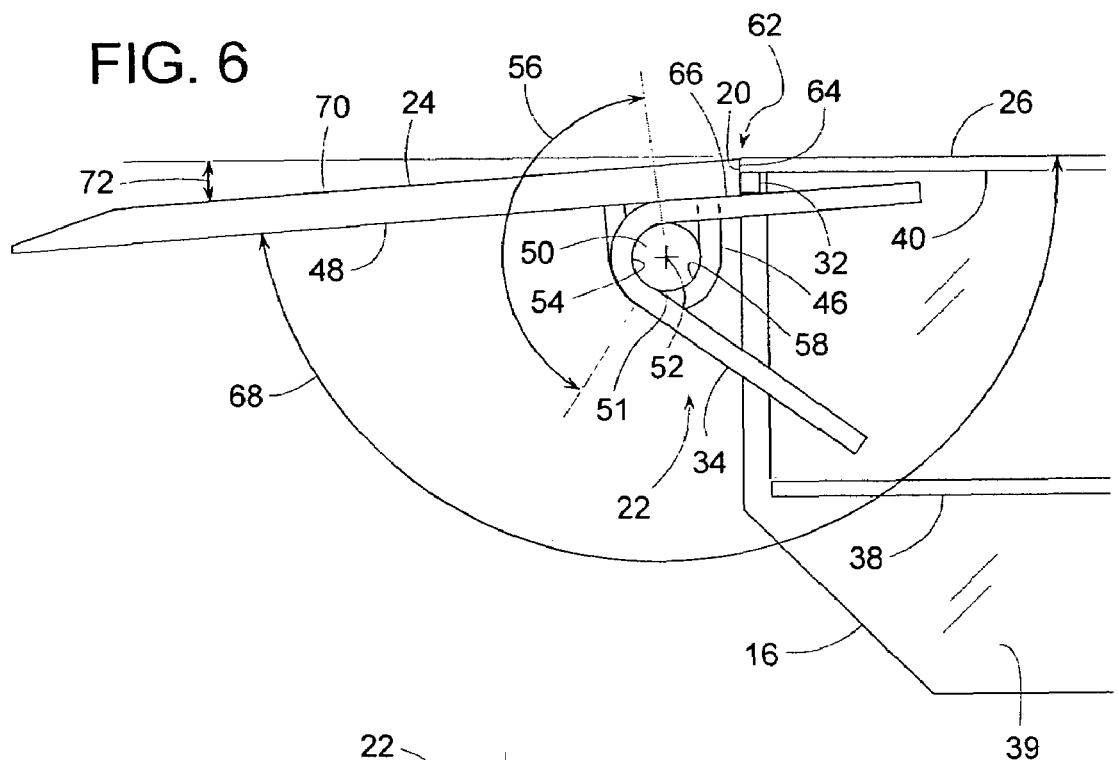
FIG. 6 is a close-up side view of the dock leveler of FIG. 3 but with a side plate of the deck removed to show details of the front hinge.
Figure 7:
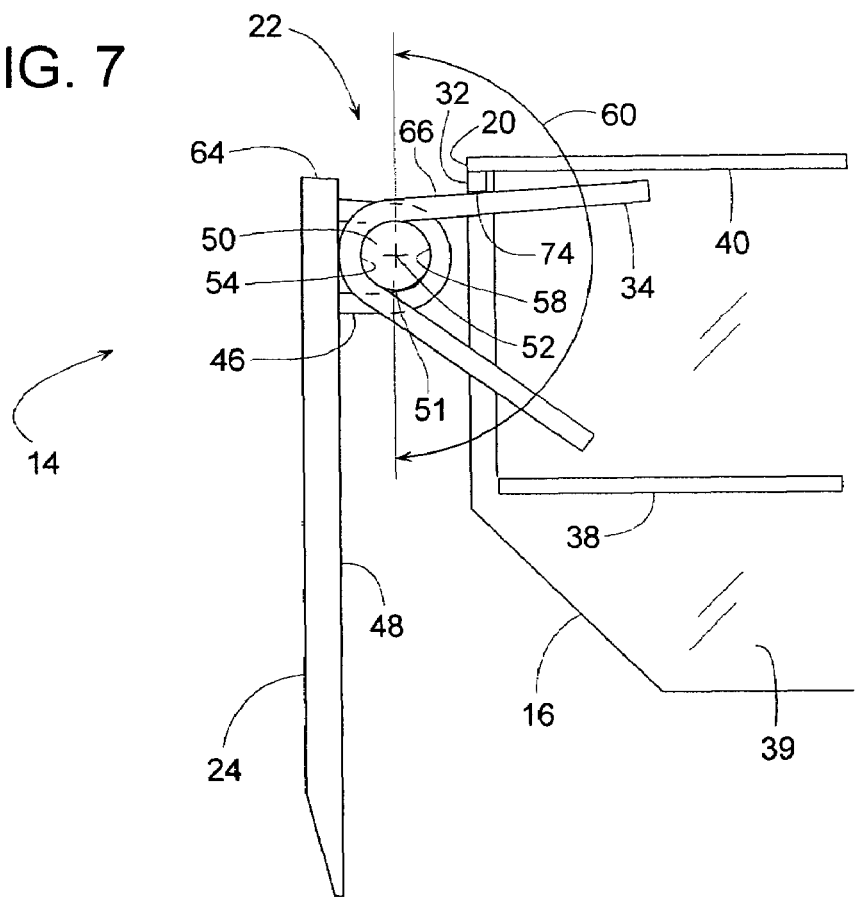
FIG. 7 is similar to FIG. 6 but showing the lip in a pendant position as also shown in FIG. 1.

Regardless of how deck 16 and lip 24 are moved, an important aspect of the invention pertains to front hinge 22 and its surrounding structure. It is this part of dock leveler 14 that helps determine the crown (angle between deck surface 26 and extended lip 24), openness of hinge 22, and the torsional flexibility of deck 16. In this first embodiment, hinge 22 is of a closed design and is mounted adjacent to a narrow front header or flange 32 (FIGS. 6 & 7). Hinge 22 and flange 32 are purposefully designed to increase the strength of the crown, optimize the torsional flexibility of the deck, and minimize total part count of the dock leveler.

Figure 5:
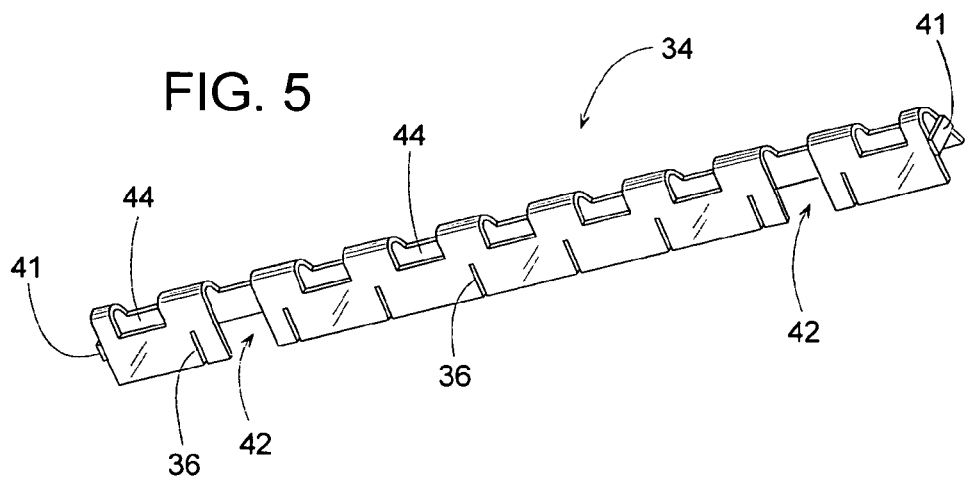
FIG. 5 is a perspective view of a deck-hinge member used in the dock leveler of FIG. 1.

Hinge 22, for instance, includes a deck-hinge member 34 cut and formed from a single sheet of material (see FIG. 5) and welded or otherwise attached to deck 16. Preferably, that attachment to deck 16 is accomplished by deck-hinge member 34 having several slits 36 for engaging a series of central support members or beams 38 to which deck hinge member 34 is welded and that support a deck plate 40 of deck 16. Deck-hinge member 34 may also be welded or otherwise attached to side support members 39. Accordingly, deck-hinge member 34 serves to structurally tie together the support members (both central and side) in a similar manner to a conventional front header—while also serving the function of creating the deck portion of the hinge structure. In the embodiment shown FIGS. 4-7, the deck-hinge member is a unitary piece connecting all of the deck support members and thus extending along most of the width of the deck 16. Alternatively, individual deck-hinge members could extend between and structurally tie together less that all of the deck support members—such as a pair of deck support members. Either form of deck-hinge members would perform both their hinge function as well as the function of extending between and thus structurally tying together two or more deck support members. Deck-hinge member 34 may be provided with pin-retaining bars 41 that help maintain the radial position of hinge pin 50 relative to deck-hinge member 34. If needed, one or more sections 42 of deck-hinge member 34 can be notched out to provide operating clearance for a lip actuator. Deck-hinge member 34 defines a plurality of apertures 44 for receiving an equal plurality of lip-hinge members 46.

Referring to FIGS. 6 and 7, lip-hinge members 46 according to this illustrative embodiment are U-shaped pieces that are welded or otherwise attached to a lower surface 48 of lip 24. With lip-hinge members 46 extending into apertures 44 of deck-hinge member 34, a hinge pin 50 can be inserted between members 34 and 46 to pivotally couple lip 24 to deck 16, whereby lip 24 can pivot about a longitudinal centerline 52 of pin 50.

For simplicity, less frictional contact area, and ease of manufacturing, deck-hinge member 34 has a curved pin-engaging surface 54 that contacts pin 50 over an area of less than 360 degrees, as indicated by arc 56 of FIG. 6. Likewise, lip-hinge member 46 also has a curved pin-engaging surface 58 that contacts pin 50 over an area of less than 360 degrees, as indicated by arc 60 of FIG. 7.

To maximize the strength and minimize the part count of the front hinge assembly, deck-hinge member 34 preferably extends seamlessly along most if not all of its length, or the width of deck 16, or the length of pin 50. The term "seamlessly" refers to a part made from one continuous piece and/or along which a straight or winding path can be traced generally lengthwise without encountering a seam or joint.

To establish a crown 62 (FIGS. 3 and 6) that can withstand heavy, repeated loading, the upward movement of lip 24 is limited by a back edge 64 of lip 24 abutting front edge 20 and/or lower surface 48 of lip 24 engaging an upper surface 66 of deck-hinge member 34. The crown angle 68 or apex between an upper lip surface 70 of lip 24 and the driveway surface 26 of deck 16 is typically about 5-degrees (angle 72) less than 180-degrees. Ideally, lip 24 abuts front edge 20 and upper surface 66 simultaneously to form crown angle 68, thereby creating a two-point crown control which aides in the longevity of maintaining a desired lip crown by distributing the repeated load of a traversing fork truck.

To provide deck 16 with an appropriate amount of torsional flexibility, flange 32 (FIGS. 6 & 7) is made particularly narrow. The deck-hinge member 34 performs some of the function of a conventional header by structurally tying two or more deck support members together, such that the addition of flange 32 provides the appropriate amount of torsional rigidity allowing deck 16 to twist so that the tip 28 of lip 24 can lie squarely atop the bed of truck 12 even when the truck bed and platform 10 are at an angle to each other (as measured from the left to right side of the truck).

Since deck plate 40 is supported by beams 38 and side supports 39, plate 40 may be thinner than lip 24. So, to prevent plate 40 from permanently deflecting or bowing downward in the areas between beams 38 and between beams 38 and side supports 39, or at least to prevent front edge 20 from deflecting much more than lip 24, flange 32 preferably provides front edge 20 of deck 16 with a level of rigidity that is comparable to that of lip 24. Because deck-hinge member 34 performs some of this function itself, flange 32 can be smaller than a conventional header, such as being of a height that places a lower edge 74 of flange 32 at an elevation that is above the lower extremity 51 of the hinge pin 50. As shown here, the lower edge 74 is above the hinge pin's centerline 52 and preferably higher than pin 50 itself. Although flange 32 is shown as a separate piece that is welded or otherwise attached to deck plate 40, alternatively, the front edge of plate 40 could be formed or bent downward to create a flange that extends integrally from plate 40, whereby deck plate 40 and flange 32 would be a unitary piece. It should be noted that flange 32 is disposed vertically between the bottom of front edge 20 and the upper surface 66 of the deck-hinge member 34. This position of flange 32 allows it to transfer loads applied to the free front edge 20 (particularly the length thereof between the support members or beams) into the deck-hinge member 34 and thus to the support members or beams to which member 34 is attached.

Figure 8:
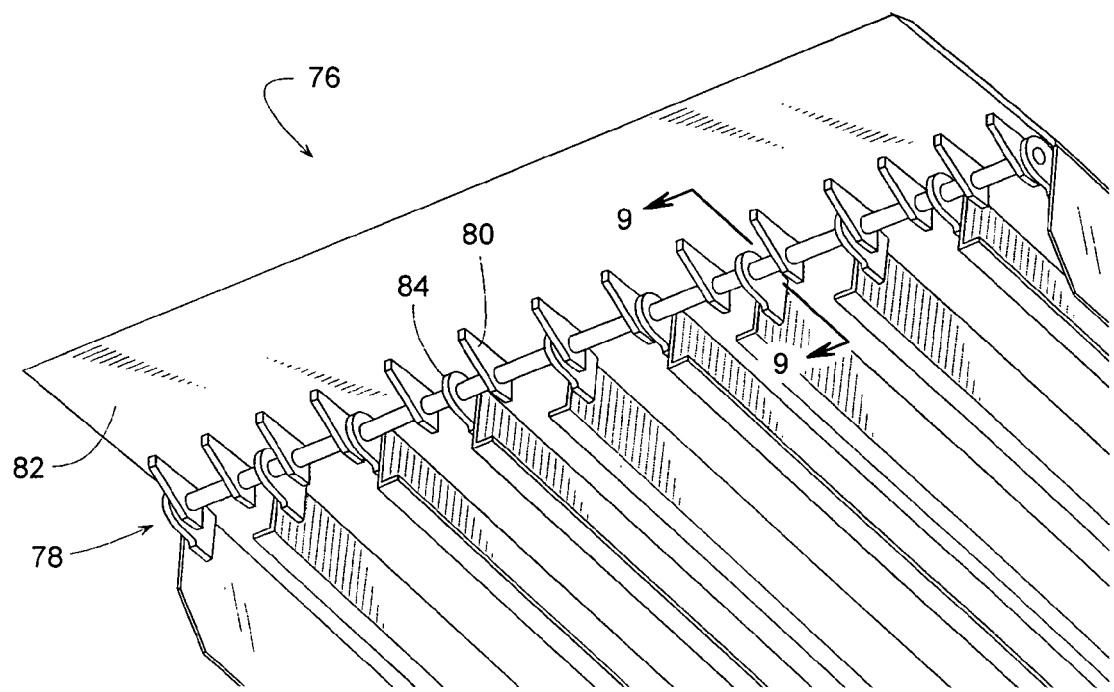
FIG. 8 is a perspective view of another embodiment of a dock leveler.
Figure 9:
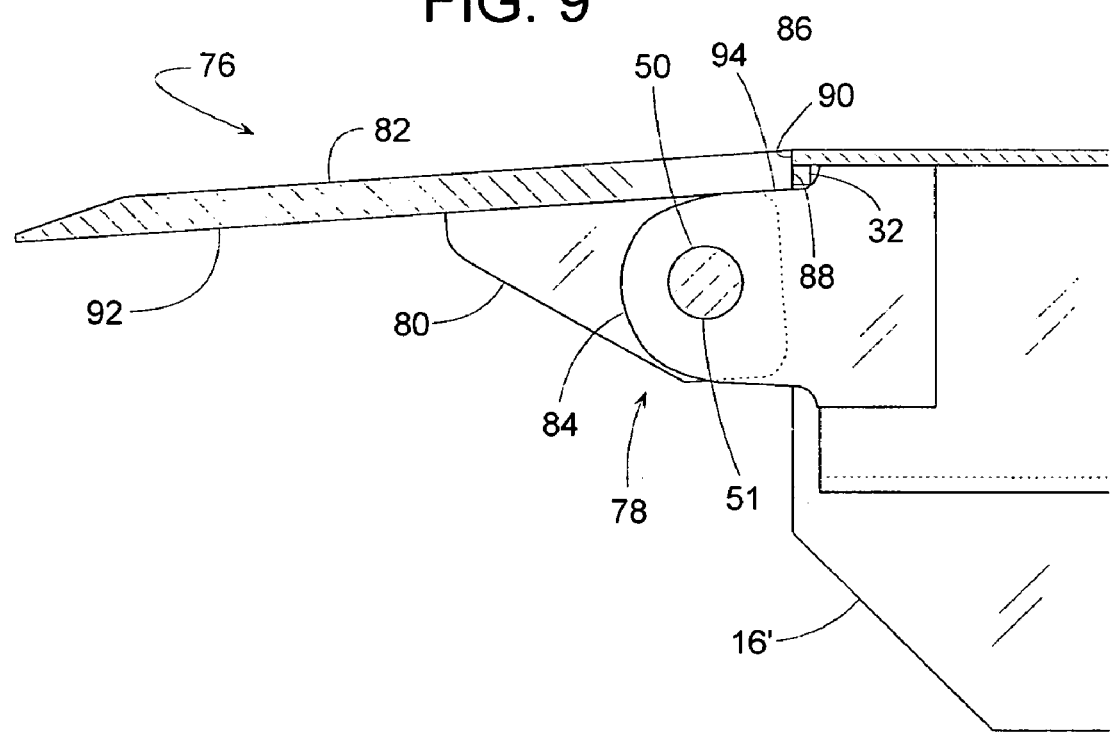
FIG. 9 is close-up side view similar to FIG. 6 but for the dock leveler of FIG. 8.
Figure 10:
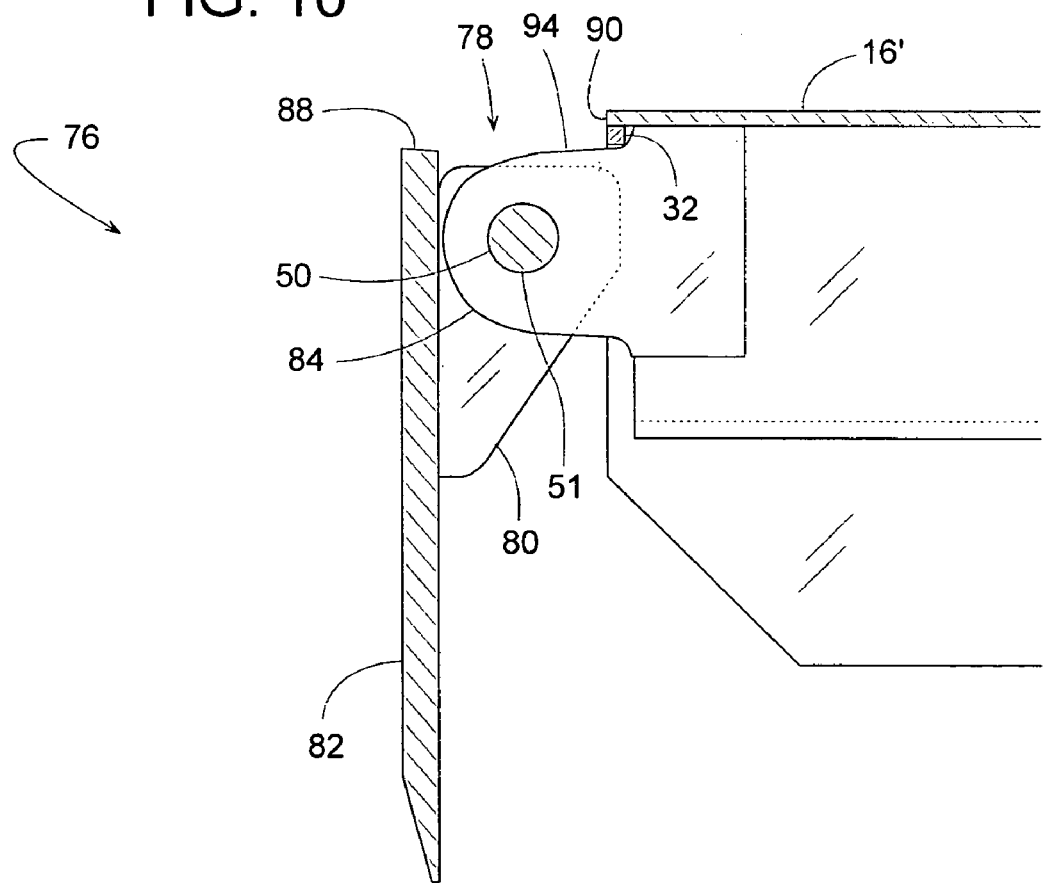
FIG. 10 is close-up side view similar to FIG. 7 but for the dock leveler of FIG. 8.

The relatively narrow flange 32 can also be used on a dock leveler 76 that has a front hinge 78 of a more open design, as shown in FIGS. 8-10. In this case, hinge 78 comprises a series of lip-hinge members 80 connected to a lip 82 and a series of deck-hinge members 84 attached to a deck 16'. Hinge pin 50 joins members 80 and 84 to render lip 82 pivotal relative to deck 16'.

To establish a crown 86 (similar to previously mentioned crown 62) that can withstand heavy, repeated loading, the upward movement of lip 82 is limited by a back edge 88 of lip 82 abutting a front edge 90 of deck 16' and/or a lower surface 92 of lip 82 engaging an upper surface 94 of deck-hinge member 84. Ideally, lip 82 abuts front edge 90 and upper surface 94 simultaneously to form crown 86, thereby creating a two-point crown control which aides in the longevity of maintaining a desired lip crown. Again, flange 32 is compressed between the free front edge of the deck and the deck hinge members 84 for applied loads. This facilitates the transfer of those loads to the support members or beams to which deck-hinge members 84 are attached thereby reinforcing the free front edge of the deck.

Although the invention is described with reference to a preferred embodiment, it should be appreciated by those of ordinary skill in the art that various modifications are well within the scope of the invention. Therefore, the scope of the invention is to be determined by reference to the following claims:

The invention claimed is:

1. A dock leveler comprising:
   a deck comprising a plate and a plurality of support members, wherein the deck is movable between a raised and a cross-traffic position and wherein the deck has a width;
   a lip pivotally coupled to the deck such that the lip is pivotal between an extended position and a pendant position, wherein the lip extends along most of the deck width; and
   a unitary deck-hinge member attached to the deck such that the deck-hinge member extends underneath the lip when the lip is in the extended position, wherein the deck-hinge member is fixed relative to the deck and extends along most of the deck width, and wherein the deck-hinge member defines a plurality of slits into which the support members extend.

2. The dock leveler of claim 1, further comprising a plurality of lip-hinge members attached to the lip, wherein the deck-hinge member defines a plurality of apertures through which the plurality of lip-hinge members extend whereby at least one hinge pin engages a deck-hinge member and a lip-hinge member to pivotally couple the lip to the deck.

3. The dock leveler of claim 2, wherein the deck-hinge member and the lip-hinge members substantially close a gap that exists between the lip and the deck when the lip is at the pendant position.

4. The dock leveler of claim 1, wherein the deck-hinge member includes an upper surface that is substantially flat and lies at a non-zero angle to a driveway surface of the deck, so that the upper surface of the deck-hinge member and the driveway surface of the deck are not parallel.

5. The dock leveler of claim 1, wherein the deck includes a driveway surface and a front edge, the lip includes an upper lip surface, a lower lip surface, and a back edge, and the deck-hinge member includes an upper hinge surface such that when the lip is in the extended position, the upper lip surface and driveway surface create an apex when the back edge of the lip engages the front edge of the deck and the lower lip surface engages the upper hinge surface.

6. The dock leveler of claim 5, wherein contact between the back edge of the lip and the front edge of the deck and the lower lip surface and the upper hinge surface maintains the apex for applied loads.

7. A dock leveler comprising:
   a deck comprising a plate and a plurality of support members, wherein the deck is movable between a raised and a cross-traffic position and wherein the deck has a width;

a lip pivotally coupled to the deck such that the lip is pivotal between an extended position and a pendant position, wherein the lip extends along most of the deck width; and a unitary deck-hinge member attached to the deck such that the deck-hinge member extends underneath the lip when the lip is in the extended position, wherein the deck-hinge member is fixed relative to the deck and extends along most of the deck width, and wherein the has a deck width, and a front edge, and comprising a lip-hinge member attached to the lip to pivotally couple the lip and deck with a hinge pin, and further comprising a flange lying adjacent to the front edge, running along most of the deck width, and extending downward from the deck plate to a lower edge of the flange, wherein the lower edge of the flange is higher than a lower extremity of the hinge pin when the deck is at the cross-traffic position.

* * * * *

UNITED STATES PATENT AND TRADEMARK OFFICE
CERTIFICATE OF CORRECTION

| | | |
|---|---|---|
| PATENT NO. | : 7,363,670 B2 | Page 1 of 1 |
| APPLICATION NO. | : 10/902458 | |
| DATED | : April 29, 2008 | |
| INVENTOR(S) | : Mitchell et al. | |

It is certified that error appears in the above-identified patent and that said Letters Patent is hereby corrected as shown below:

Col. 7, line 10 before "has a deck width" insert --plate--.

Signed and Sealed this

Nineteenth Day of August, 2008

JON W. DUDAS
*Director of the United States Patent and Trademark Office*